United States Patent [19]

Labes

[11] 4,066,567
[45] Jan. 3, 1978

[54] LIQUID CRYSTAL CUMULATIVE DOSIMETER

[75] Inventor: Mortimer M. Labes, Philadelphia, Pa.

[73] Assignee: Temple University, Philadelphia, Pa.

[21] Appl. No.: 655,080

[22] Filed: Feb. 4, 1976

[51] Int. Cl.$^2$ .................. C09K 3/34; G01K 3/00; G01K 11/16
[52] U.S. Cl. .................. 252/299; 23/230 LC; 73/356; 116/114 V; 252/408; 428/1
[58] Field of Search .............. 73/356; 252/299, 408; 350/160 LC; 428/1; 23/230 LC; 116/114 V

[56] References Cited

U.S. PATENT DOCUMENTS

| | | | |
|---|---|---|---|
| 2,951,764 | 9/1960 | Chase | 116/114 V |
| 3,409,404 | 11/1968 | Fergason | 252/299 |
| 3,576,761 | 4/1971 | Davis | 252/299 |
| 3,594,126 | 7/1971 | Fergason et al. | 252/299 |
| 3,679,290 | 7/1972 | Adams et al. | 252/299 |
| 3,697,297 | 10/1972 | Churchill et al. | 252/299 |
| 3,720,623 | 3/1973 | Cartmell et al. | 252/299 |
| 3,768,976 | 10/1970 | Hu et al. | 116/114 V |
| 3,773,747 | 11/1973 | Steinstrasser | 252/299 |
| 3,819,531 | 6/1974 | Sheva et al. | 252/299 |
| 3,853,785 | 12/1974 | Labes | 252/408 LC |
| 3,872,140 | 3/1975 | Klanderman et al. | 252/299 |
| 3,877,411 | 4/1975 | MacDonald | 116/114 V |
| 3,927,977 | 12/1975 | Jacobs | 23/230 LC |
| 3,966,414 | 6/1976 | Khattab et al. | 73/356 |
| 3,970,579 | 7/1976 | Taylor | 252/299 |
| 3,974,317 | 8/1976 | Sharpless | 73/356 |
| 4,011,046 | 3/1977 | Labes | 23/230 LC |

FOREIGN PATENT DOCUMENTS

| | | | |
|---|---|---|---|
| 4,869,775 | 9/1973 | Japan | 252/299 |
| 224,674 | 11/1974 | United Kingdom | 116/114 V |

*Primary Examiner*—Benjamin R. Padgett
*Assistant Examiner*—T. S. Gron
*Attorney, Agent, or Firm*—Miller & Prestia

[57] ABSTRACT

Cumulative temperature dosimeter utilizes a temperature dependent reaction in a cholesteric liquid crystal composition to produce a color change indicative of temperature exposure over a period of time.

Typically, the composition includes, as a solvent, a cholesteric liquid crystal, such as a mixture of p-methoxy-p'-n-butyl-azoxybenzene, cholesteryl nonanoate, cholestyl chloride, and cholesteryl oleyl carbonate. One or more solutes are included, the solutes being reactive at a rate which is temperature dependent, to cause either generation or consumption of mesogenic compounds. In turn, the pitch of the solvent, observable as a visible color change, is affected in proportion to the cumulative temperature exposure of the composition.

18 Claims, No Drawings

LIQUID CRYSTAL CUMULATIVE DOSIMETER

This invention pertains to liquid crystal compositions suitable for use in cumulative dosimeters and to cumulative dosimeters based on such compositions. More specifically, this invention pertains to compositions including a cholesteric liquid crystal compound, the light reflecting properties of which are changed by a reaction which is dependent upon the cumulative exposure of the composition to temperature within a limited range.

Heat sensitive compositions are well known. In many cases, color changes are effected in such compositions which are indicative of the exposure of the compositions to a particular temperature. Usually, these compositions are reversible. Often, the change reflects a physical reaction, such as fusion or melting, although the rate of reaction is sometimes tailored, such that a certain lag is built into the indicator. Liquid crystals have been used in many instances in indicator compositions of these types.

But indicators, even irreversible ones, which indicate only that a certain condition, such as a specific temperature has been reached, are of limited value where it is important to know that a temperature condition outside of some limit has prevailed for several hours. In the case of frozen foods, for example, it is not enough however to know that the surface temperature of a frozen food package has exceeded 0° C for a short period of time. A more realistic measure of the acceptability of storage conditions of such a frozen food package would be a cumulative indication of the exposure of the package to elevated temperature.

It is the general object of the present invention to provide compositions wherein an observable change depends on the cumulative exposure of a composition or product, to a temperature within a particular temperature range.

A more specific object of this invention is to provide such compositions based on cholesteric liquid crystals, and most specifically to provide such compositions wherein the change is observable as a color change.

These and other objects which will be apparent in the course of the subsequent description of this invention are met by a composition including a cholesteric liquid crystal compound with one or more of the constituents of the composition being adapted to enter into a chemical reaction, the rate of which is directly proportional to the exposure of the composition to temperature. The light reflecting properties of the composition are changed in proportion to the degree of completeness of the reaction, preferably by effecting a color change of the composition.

Preferably also the composition is packaged in a manner to facilitate its use as an indicator of the cumulative dosage of some product to heat in a particular temperature range. More preferably, the composition of this invention is adapted to sense a cumulative dosage of frozen products to temperature above the desired storage temperature, for example with a reaction adapted to reach equilibrium within a range of exposure from 5° C for 100 to 1000 hours, to 25° C for 1 hour to 100 hours.

This invention may be better understood by reference to the following detailed description thereof, taken in conjunction with the appended claims.

Generally, the light reflecting properties, particularly the color, of a cholesteric liquid crystal compound, are readily changed, either by some chemical change in the liquid crystal or by a reaction involving the liquid crystal to produce some other compound which affects the color thereof, or by the reaction of extraneous materials, such as a solute or diluent, which affects the color of the liquid crystals differently than the starting compounds in the reaction. To the extent such a reaction is rate dependent on exposure to energy in some form, such as temperature, the color change observable in the cholesteric liquid crystals is cumulatively indicative of the time and intensity or level of the energy input to which the reaction is sensitive.

In the present invention, compositions, yielding such cumulative indications of temperature exposure, are based on cholesteric liquid crystal solvents chosen such that the wavelength of maximum reflection of the cholesteric is in the visible region of the spectrum and such that the temperature dependence of the wavelength of maximum reflection of the cholesteric is negligible at the temperatures involved in the reaction. In this cholesteric solvent solutes are included. These solutes are reactive at a rate which is temperature dependent, their reaction either producing or consuming an optically active mesogenic molecule. The generation or consumption of such a molecule in the solvent perturbs the pitch of the solvent to cause either a red or blue shift in the wavelength of maximum reflection.

As one example of the composition within the scope of the present invention, a relatively temperature-insensitive cholesteric liquid crystal is combined with N-(p-methoxybenzylidene)-p-n-butylaniline (MBBA) and (−)-α-phenethylamine. These compounds react at a rate dependent on temperature to produce

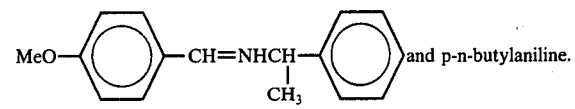

The products of this reaction have a much higher degree of helical twisting power than the reactants and, as a result, the composition changes color as the reaction goes toward completion. As a specific example of one cholesteric liquid crystal which is relatively temperature-insensitive in its light reflecting properties and which is suitable as a solvent in the compositions of the present invention, a mixture of 0.9 parts by weight of cholesteryl nonanoate, 1.1 parts by weight of cholesteryl chloride, and 2 parts by weight of cholesteryl oleyl carbonate is mixed with 40% by weight of Nematic Phase V (a product consisting of the isomers of p-methoxy-p'-n-butylazoxybenzene, trade name Nematic Phase V of E. Merck, Darmstadt, West Germany) to yield a blue cholesteric solvent. The same mixture of cholesterics is mixed with 55% by weight of Nematic Phase V to yield a red solvent.

A variety of other cholesteric solvents may also be used, such as mixtures of left-handed cholesteric compounds such as cholesteryl nonanoate, hexanoate, decanoate, etc. with right-handed cholesteric compounds such as cholesteryl chloride, bromide, iodide or nitrate, blended with cholesteryl oleyl carbonate or cholesteryl-2-(ethoxyethoxy) ethyl carbonate or any low temperature mesomorphic carbonate ester of cholesterol. To this cholesteric mixture may be added nematogenic materials such as Nematic Phase V, a p-alkyl-p'-cyano biphenyl or any nematogen having a nematic range close to room temperature.

A variety of other compounds may be included in such cholesteric solvents either to generate or consume optically active mesogenic molecules. For example aldehydeamine condensations, such as

R—⟨C₆H₄⟩—CHO + NH₂—R'—⟨C₆H₄⟩—R''

→ R—⟨C₆H₄⟩—CH=N—R'—⟨C₆H₄⟩—R'' + H₂O (R and R'' are alkyl or alkoxy with 1 to 8 carbon atoms and R' is an alkylene group, e.g. —(CH₂)—, with from 1 to 18 carbon atoms) where one of the components of the reaction is optically active. Two specific examples of such reactions are (1) EtO—⟨C₆H₄⟩—CHO + NH₂—CH(CH₃)—⟨C₆H₅⟩

(p-ethoxy benzaldehyde) (+) or (−) α-phenethylamine.

(2) EtO—⟨C₆H₄⟩—CHO +

NH₂—⟨C₆H₄⟩—CH=CH—COO—l-amyl (l-amyl ester of p-amino-cinnamic acid)

Another class of reaction which may be used in this manner are amine exchange reactions of Schiff bases, wherein a mesogenic Schiff base is reacted with practically any amine. In this class of reactions, both the Schiff base and the amine may be optically active. Examples of such reactions are Class B: Amine exchange reactions of Schiff bases.

(1) EtO—⟨C₆H₄⟩—CH=N—⟨C₆H₄⟩—C₄H₇ +

NH₂—CH(CH₃)—⟨C₆H₅⟩

(+) or (−) α-phenethylamine (2) EtO—⟨C₆H₄⟩—CH=N—⟨C₆H₄⟩—CH=CHCOO-l-amyl +

NH₂—CH(CH₃)—⟨C₆H₅⟩

(+) or (−) α-phenethylamine (3) EtO—⟨C₆H₄⟩—CH=N—CH(CH₃)—⟨C₆H₅⟩ +
(−) or (+)

NH₂—CH(CH₃)—⟨C₆H₅⟩
(+) or (−)

Reactants which generate a mesogenic benzoate ester may also be used in the compositions of this invention. In general, these reactions proceed as follows:

R—⟨C₆H₄⟩—C(=O)—O—C(=O)—⟨C₆H₄⟩—R + HO—R'—⟨C₆H₄⟩—R

R—⟨C₆H₄⟩—C(=O)—O—R'—⟨C₆H₄⟩—R

+ R—⟨C₆H₄⟩—COOH, one example of which is (CH₃(CH₂)₆—⟨C₆H₄⟩—C)₂O + HO—CH(CH₃)—⟨C₆H₅⟩ →

—CH₃(CH₂)₆—⟨C₆H₄⟩—C(=O)—O—CH(CH₃)—⟨C₆H₅⟩

CH₃(CH₂)₆—⟨C₆H₄⟩—COOH.

Compositions based on the foregoing are designed and calibrated to effect a characteristic change in light reflecting properties dependent on the exposure of the reactants to temperature and indicative of the exposure of the reactants to temperature within a specific temperature range over a period of time. A color change is thus exhibited indicating, for example, that the composition has been exposed to a temperature in the range of 0° -25° C for a period of several hours, the degree of the color change being proportional to the degree of completion of the reaction.

In a typical application of the composition of the present invention, a pharmaceutical product may be packaged with the pod of a cholesteric liquid crystal containing chemical solutes which react at a reasonable rate only at temperatures greater than 25° C but which react at slower rates at temperatures up to 25° C. The cholesteric is blended so that its normal color is, for example, red at temperatures between 0° C and 25° C with a shift in color brought about by reaction of the solutes, to blue, for example, The proposed storage temperature of the pharmaceutical is 0° C or below, at which temperature the reaction rate of the solutes in the cholesteric liquid crystal is substantially zero. Further, the solute reaction is controlled by means of concentration of reactants so that the reaction will go substantially to completion within a range of exposure of from 5° C for 100 to 1000 hours to 25° C for 1 to 100 hours.

Preferably also, the indicator composition of this invention is packaged in a pod or container with a transport section which may be mounted on the surface of the product to be monitored for temperature dosage. Still more preferably, the composition containing pod may include an elongated section to extend inwardly in the product so as to sense the inner temperature in the case of a temperature dosimeter.

A color indicator may also be included on the container or near the sensing composition for comparison to the color of the composition which is indicative of the dosage levels of concern.

While this invention has been described with reference to particular embodiments thereof, it should be understood that it is not limited thereto and that the intended claims are intended to be construed to cover such equivalent variations and modifications of this invention which may be made by those skilled in the art without departing from the true spirit and scope thereof.

I claim:

1. A cholesteric liquid crystal composition comprising a cholesteric liquid crystal solvent and reactive solutes adapted to enter into a chemical reaction, said liquid crystal solvent having a wavelength of maximum reflection the temperature dependence of which is negligible at the temperatures involved in the reaction, the rate of said reaction being temperature dependent, the products of said reaction being adapted to cause a characteristic change in the light reflecting properties of said composition, the degree of said change being cumulatively indicative of the exposure of said composition to temperature outside of a preselected limit.

2. A composition, as recited in claim 1, wherein said different light reflecting properties are observable as a color change in said composition.

3. A composition, as recited in claim 1, wherein said solutes are reactive at a temperature dependent rate to generate or consume mesogenic molecules.

4. A composition, as recited in claim 3, wherein said cholesteric liquid crystal solvent comprises a mixture of cholesteryl nonanoate, cholesteryl chloride, cholesteryl oleyl carbonate, and the isomers of para-methoxy-p'-n-butylazoxybenzene.

5. A composition, as recited in claim 4, wherein said mixture consists of 0.9 parts by weight of cholesteryl nonanoate, 1.1 parts by weight of cholesteryl chloride, and 2 parts by weight of cholesteryl oleyl carbonate, combined with 40% by weight of a sub-mixture of the isomers of paramethoxy-p'-n-butylazoxybenzene.

6. A composition as recited in claim 4, wherein said mixture consists of 0.9 parts by weight of cholesteryl nonanoate, 1.1 parts by weight of cholesteryl chloride, and 2 parts by weight of cholesteryl oleyl carbonate, combined with 55% by weight of a sub-mixture of the isomers of paramethoxy-p'-n-butylazoxybenzene.

7. A composition, as recited in claim 1 wherein said composition comprises a mixture of left-handed cholesteric compounds selected from the group consisting of cholesteryl nonanoate, cholesteryl hexanoate, cholesteryl decanoate or any other straight chain cholesteryl $C_1$ to $C_{20}$ alkanoate and right-handed cholesteric compounds selected from the group consisting of cholesteryl chloride, cholesteryl bromide, cholesteryl iodide and cholesteryl nitrate, in combination with any low temperature mesomorphic carbonate ester of cholesterol.

8. A composition, as recited in claim 7, wherein said low temperature mesomorphic carbonate ester of cholesterol is cholesteryl oleyl carbonate or cholesteryl-2-(ethoxyethoxy) ethyl carbonate.

9. A composition, as recited in claim 3, wherein said reactive solutes enter into a mesogenic reaction selected the group consisting of aldehyde-amine condensations, Schiff base-amine reactions or benzoate ester formations.

10. A composition, as recited in claim 9, wherein said reactive solutes are p-ethoxybenzaldehyde and (+) or (−) α-phenethylamine.

11. A composition, as recited in claim 9, wherein said reactive solutes are

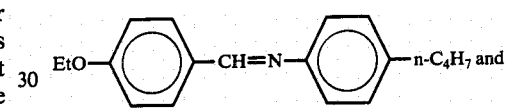

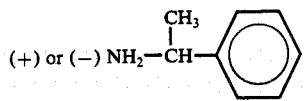

12. A composition, as recited in Claim 9, wherein said reactive solutes are N-(p-methoxybenzylidene)-p-n-butyl-aniline and (−)-α-phenethylamine.

13. A composition, as recited in claim 9, wherein said reactive solutes are

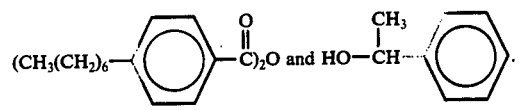

14. A composition, as recited in claim 3, wherein said reaction rate is dependent on and proportional to exposure of said composition to a temperature above some predetermined maximum.

15. A container, having at least one transparent section to permit observation of the color of a material disposed therein, said container containing a composition as recited in claim 1.

16. A container with composition therein, as recited in claim 15, said container having a shape adapted to extend inwardly into a product to sense the cumulative temperature exposure thereof.

17. A container with composition therein, as recited in claim 15, wherein said container includes a color indicator for comparison to said composition to determine the cumulative dosage sensed thereby.

18. A method of determining the cumulative time of exposure of an indicator element to temperatures above a preselected limit said method comprising (1) providing a cholesteric liquid crystal composition comprising a cholesteric liquid crystal solvent and reactive solutes adapted to enter into a chemical reaction at temperatures above said preselected temperature limit, said liquid crystal solvent having a wavelength of maximum reflection the temperature dependence of which is negligible at the temperatures involved in the reaction, the rate of said reaction being temperature dependent, and (2) after a period of time, observing any change in the optical properties of the cholesteric liquid crystal composition.

* * * * *